United States Patent [19]
Ichikawa et al.

[11] Patent Number: 4,976,404
[45] Date of Patent: Dec. 11, 1990

[54] FLOW CONTROL VALVE

[75] Inventors: Yasunori Ichikawa; Shigeru Yamaguchi; Hiroshi Ohnishi; Akira Kojima; Akira Kato, all of Kanagawa, Japan

[73] Assignee: Fuji Photo Film Co., Ltd., Kanagawa, Japan

[21] Appl. No.: 226,907

[22] Filed: Aug. 1, 1988

[30] Foreign Application Priority Data

Jul. 30, 1987 [JP] Japan ................ 62-188734

[51] Int. Cl.$^5$ .................. F16K 1/38; F16K 31/04
[52] U.S. Cl. ................. 251/121; 251/129.05; 251/122; 251/129.11; 251/129.08
[58] Field of Search ........... 251/129.08, 205, 129.11, 251/129.12, 121, 122, 129.05

[56] References Cited

U.S. PATENT DOCUMENTS

| | | | |
|---|---|---|---|
| 2,590,318 | 3/1952 | Hollis | 251/121 |
| 3,221,767 | 12/1965 | McCarty et al. | 251/121 X |
| 3,280,836 | 10/1966 | Callaghan, Jr. et al. | 251/205 X |
| 3,488,030 | 1/1970 | Hulme et al. | 251/129.12 |
| 3,521,852 | 7/1970 | Gillis, Jr. | 251/121 |
| 4,097,786 | 6/1978 | Lund | 251/129.11 X |
| 4,412,517 | 11/1983 | Kobashi et al. | 251/129.11 X |
| 4,480,614 | 11/1984 | Kobashi et al. | 251/129.12 X |
| 4,575,047 | 3/1986 | Boos et al. | |
| 4,771,807 | 9/1988 | Karani | 251/129.05 X |

FOREIGN PATENT DOCUMENTS

| | | | |
|---|---|---|---|
| 569935 | 8/1958 | Belgium | 251/205 |
| 589079 | 12/1959 | Canada | 251/205 |
| 614961 | 2/1961 | Canada | 251/205 |
| 116855 | 8/1984 | European Pat. Off. | 251/129.11 |
| 1062507 | 7/1959 | Fed. Rep. of Germany | 251/205 |
| 1408448 | 11/1972 | Fed. Rep. of Germany | |
| 58-121381 | 7/1983 | Japan | |

OTHER PUBLICATIONS

E. Sprenger, W. Höhmann, "Taschenbuch für Heizung und Klimatechnik", 62. Ausgabe, 1983, R. Oldenbourg, Verlag München, Wien, pp. 1068, 1069.

Primary Examiner—Arnold Rosenthal
Attorney, Agent, or Firm—Sughrue, Mion, Zinn, Macpeak & Seas

[57] ABSTRACT

A flow control having a wide flow rate range and excellent linearity between the degree of valve opening and flow rate. The valve includes a cylindrical or conical valve head formed on a circular-truncated-cone-shaped working face which is tapered towards the outlet of the valve with the valve head being located inside the outlet-side casing. With respect to the area of the valve opening defined by the valve head and the valve seat, the valve head is shaped so that the rate of change of the flow rate with valve stroke is small and linear, whereby fine control of the flow rate can be accurately achieved over the entire flow rate range. The valve stroke to fully open the valve occurs in the inlet-side casing. A servo motor or the like is employed as the drive source for operating the valve.

9 Claims, 2 Drawing Sheets

A-A' SECTION

A-A' SECTION

FLOW CONTROL VALVE

BACKGROUND OF THE INVENTION

The present invention relates to a flow control valve, and more particularly to a flow control valve which is capable of achieving accurate flow control over a wide flow range.

Flow control valves employing a needle valve construction are well known in the art. However over a wide flow range of the order of 0 to 100 liters/min, a needle valve is not practical in use because of its unavoidably large size compared with the sizes of the inlet and outlet pipes with which it is used. Furthermore, in a needle valve the relationship between the degree of opening and the flow rate is not linear. Thus, in order to overcome these difficulties, a hand-cock type of valve has been developed.

Practical examples of such flow control valves include pneumatic automatic control valves such diaphragm valves and butterfly valves, and motor-driven automatic control valves such as ball valves in which the degree of valve opening or the flow passage clearance is controlled. (See, for example, Japanese Unexamined Published Patent Application No. 121381/83).

However, in any conventional flow control valve, in order to increase the flow rate range over which the valve can be used, the size of the valve is unavoidably increased. Furthermore, as indicated by a and b in FIG. 3, which is a graphical representation showing low rate as a function of the degree of opening of a valve, it is difficult to make the relation between flow rate and the degree of opening linear over a wide range of flow rates. That is, if the relation is made linear in a low flow rate range b, then it is impossible to obtain a wide flow range, while, on the other hand, if the relation is made linear in a high flow range a, then it is difficult to obtain linearity for low flow rates.

Moreover, if a flow control valve having a wide flow range is used, then the control resolution is lowered, and moving the valve between fully opened and fully closed positions takes a relatively long time. If the resolution is improved, then the response characteristic is degraded.

SUMMARY OF THE INVENTION

Accordingly, it is an object of the present invention to provide a flow control valve in which the difficulties described above have been eliminated.

More specifically, an object of the invention is to provide a flow control valve having a wide flow range, in which the rate of change of flow rate with valve stroke is small and linear, in which control is achieved with high accuracy and with good reproducibility, and the resolution and response characteristics are excellent.

The foregoing and other objects of the invention have been achieved by the provision cf a flow control valve which, in accordance with the present invention, comprises an electric motor for operating the valve, a feed screw mechanism and a coupling plate for converting rotation of the motor into linear motion, a valve shaft secured to the coupling plate whereby the valve shaft is moved vertically as the coupling plate is moved vertically, a valve casing comprising an inlet-side casing extending along the central axis of the valve shaft and an outlet-side casing merging with the inlet-side casing, and a valve body having a circular-truncated-cone-shaped working face which tapers towards the outlet of the valve and is in the inlet-side of the casing, the valve head extending downward from the working face of the valve body, being shaped with respect to a valve opening area between the valve head and valve seat so that the rate of change of flow rate with valve stroke is small and linear, and the valve stroke needed to fully open the valve occurs in the inlet-side casing.

In accordance with the invention, the circular-truncated-cone-shaped working face which tapers towards the outlet of the valve is designed so that it can be brought into close contact with the valve seat with high accuracy.

As described above, in the inventive flow control valve, the cylindrical or conical valve head with the circular-truncated-cone-shaped working face is constructed so that the valve head is in the outlet-side casing. That is, the valve head is shaped as an elongated cylinder or cone, and the valve head is surrounded by the long outlet-side casing to protect it from damage.

Furthermore, in the flow control valve of the invention, the valve head is shaped with respect to the valve opening area between the surface of the valve head and the valve seat so that the rate of change of flow rate with valve stroke is small and linear That is, the valve head is shaped so that when the valve head is moved upwardly by operating the valve shaft, the valve opening area between the valve seat and the surface of the valve head is shaped so that the rate of change of flow rate with valve stroke is small and linear.

Furthermore, the valve stroke needed to fully open the valve occurs in the inlet-side casing. That is, a long inlet-side casing is provided for accommodating the long cylindrical or conical valve head while it is completely lifted and disengaged from the valve seat.

Accordingly, in the case of connecting the inventive flow control valve in a solution-carrying pipe, it is desirable that the solution inlet be provided at a part of the inlet-side casing where the resistance against the flow of the solution is a minimum when the valve is fully opened, whereas the solution outlet is provided at the end of the outlet-side casing so that the solution flows smoothly at a high flow rate.

DESCRIPTION OF THE PREFERRED EMBODIMENTS

Figure 1:
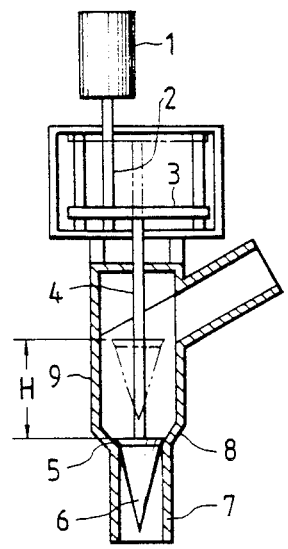
FIG. 1 is a sectional view of an example of a flow control valve constructed in accordance with the present invention.

A preferred embodiment of the invention will be described with reference to the accompanying drawings FIG. 1 shows a side view of a preferred embodiment of a valve of the invention. It should be noted of course that the invention is not to be construed as being limited to the particular embodiment shown in FIG. 1.

As a servo motor 1 rotates, its screw shaft 2 is rotated, thereby feeding a coupling plate 3 vertically. A valve shaft 4 is secured to the coupling plate 3. Thus, as the coupling plate 3 is moved vertically, the valve shaft 4 is also moved vertically.

Figure 3:
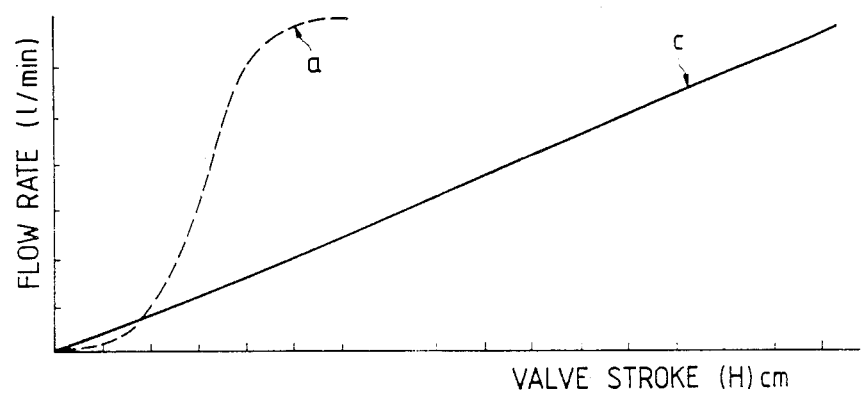
FIG. 3 is a graphical representation showing characteristic curves of flow rate with valve opening degree of a conventional valve and a valve constructed in accordance with the present invention.

A cylindrical or conical valve head 6 extends from a circular-truncated-cone-shaped working face 5 tapering towards the solution outlet of the flow control valve and located in the closed state of the valve inside the end portion, namely, the outlet side casing 7 of a composite valve casing. With respect to the valve opening defined between the valve head 6 and the valve seat 8, the valve head 6 is shaped so that the rate of change of the flow rate with respect to the valve stroke H is small and linear, as indicated at c in FIG. 3. The stroke to fully open the valve occurs within an inlet-side casing 9.

In the flow control valve of the invention, the materials of the valve casing (inclusive of the inlet- and outlet-side casings and the valve seat) and the valve body are not particularly limited. However, in order to achieve a better machining accuracy and to prevent the valve casing and valve body from seizing should foreign matter adhere to the valve casing and valve body, it is preferred that the valve casing and valve body be made of different materials and/or have different hardnesses. For instance, they may be formed of iron and stainless steel, ordinary stainless steel and hard-chromium-plated stainless steel, or ceramic and stainless steel.

In the above-described embodiment, an electric motor is employed to control the mechanical position, angle, and speed of the valve in response to an input signal. Examples of suitable motors include an AC servo motor, a DC servo motor, and a stepping or pulse motor.

Figure 2A:
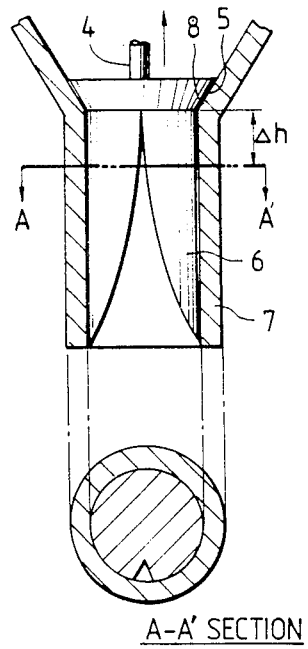
FIG. 2A is a vertical sectional view of a cylindrical valve head in the flow control valve cf FIG. 1 and a cross-sectional view taken along a line A-A' in the vertical sectional view.
Figure 2B:
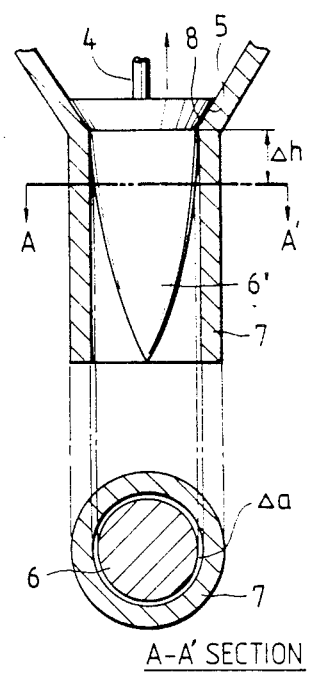
FIG. 2B is a vertical sectional view of a conical valve head in the flow control valve of FIG. 1 and a cross-sectional view taken along a line A-A' in the vertical sectional view.

Typical examples of the cylindrical or conical valve head 6 are shown in FIGS. 2A and 2B, FIG. 2A showing a cylindrical valve head 6 and FIG. 2B a conical valve head 6'. In either case, the valve head is constructed so as to linearize the relation between the valve stroke difference $\Delta h$ and the opening area difference $\Delta a$.

Theoretically, either shape can be used. However, in practice, it is very difficult to achieve perfect linearity. Thus, it may be necessary to approximate the relation where the change $\Delta h$ per $\Delta a$ is small by a straight line and by a curve elsewhere. In such a case, good linearity is liable to be lost when the valve approaches the fully opened position. Especially by increasing the length of the valve head and the diameter of the valve casing, the change of flow rate in the required range can be maintained more linear.

As described above, in the flow control valve of the present invention, a cylindrical or conical valve head is formed on a circular-truncated-cone-shaped working face which is tapered towards the outlet of the valve with the valve head being located inside the outlet-side casing, and, with respect to the area of the valve opening defined by the valve head and the valve seat, the valve head is shaped so that the rate of change of the flow rate with valve stroke is small and linear, whereby fine control of the flow rate can be accurately achieved over the entire flow rate range.

Furthermore, since the valve stroke needed to fully open the valve occurs in the inlet-side casing, the fluid will flow smoothly from the inlet to the outlet of the valve. As a result, the flow range handled by the valve of the present invention can be considerably widened, for example, by a factor of about 50. Moreover, since an electric motor is employed to operate the flow control valve, feedback control can be readily implemented, and control can be effected with high resolution and with a quick response.

Specific examples of flow control valves constructed in accordance with the invention will now be described:

EXAMPLE 1

A commercially available diaphragm control valve and a valve constructed in accordance with the invention were employed in a system with a metering pump. The flow rate was linearly changed from 10 to 20 liters/min over a period of ten minutes in both cases. With the commercially available valve, a 2 to 5% delay from the preset value occurred and a 1 to 3% flow variation occurred. On the other hand, with the valve of the invention, the delay was 1% or less, and the flow variation was 0.5% or less.

Thus, it was demonstrated that the flow control valve of the invention is excellent in both control resolution and response.

EXAMPLE 2

A flow rate measurement was repeatedly carried out with the opening degree of a commercially available diaphragm control valve fixedly set to 50%. in this case, fluctuations of the order of 3% of the average occurred. The same test was carried out on a valve constructed according to the invention. In the latter case, the result was only $\pm 0.5\%$ or less.

As described above, in the flow control valve of the present invention, a cylindrical or conical valve head is formed on a circular-truncated-cone-shaped working face which is tapered towards the outlet of the valve with the valve head being located inside the outlet-side casing, and, with respect to the area of the valve opening defined by the valve head and the valve seat, the valve head is shaped so that the rate of change of the flow rate with valve stroke is small and linear, whereby fine control of the flow rate can be accurately achieved over the entire flow rate range. Also the valve stroke to fully open the valve occurs in the inlet-side casing, and a servo motor or the like is employed as the drive source for operating the valve As a result:

(1) By suitably selecting the size and length of the valve in accordance with the application in which it is used, with only a single valve, flow control over a wide range of 1:50 can be achieved with a high accuracy.

(2) The relation of the opening degree with flow rate is substantially linear. Therefor, when automatic control is carried out with the inventive flow control valve combined with a flow meter or the like, the load on an external control device can be significantly reduced.

(3) Even if the set value of the flow rate is changed continuously or stepwise, the inventive flow control valve is excellent both in its response characteristic and in reproducibility.

(4) Compared with a conventional diaphragm control valve the flow control valve of the invention has a wide flow control range, improved control characteristic, and compact structure.

What is claimed is:

1. A flow control valve comprising:
an electric motor;

a feed screw mechanism and coupling plate for converting a rotational output of said motor into linear motion;

a valve shaft coupled to said coupling plate, said valve shaft being moved vertically as said coupling plate is moved;

a valve casing comprising an inlet-side casing and an outlet-side casing, a valve seat being defined by a lower end portion of said inlet side casing, said inlet-side casing and an outlet-side casing, a valve shaft, said outlet-side casing merging with said inlet-side casing;

a valve body fixed to a lower end of said valve shaft, said valve body comprising a circular-truncated-cone-shaped working face extending downward from said valve shaft and tapered towards an outlet of said valve, and a valve head extending downward from said working face, said working face being seated against said valve seat and said valve head being positioned in said outlet-side casing when said valve is fully closed, said valve head being shaped with respect to a valve opening area between a surface of said valve head and said valve seat so that a rate of change of flow rate with valve stroke is small and linear, said valve head being positioned within said inlet-side casing when said valve is fully open.

2. The flow control valve of claim 1, wherein said valve head is cylindrically shaped.

3. The flow control valve of claim 1, wherein said valve head is conically shaped.

4. The flow control valve of claim 1, wherein said valve body and said casing arc made of different materials.

5. The flow control valve of claim 1, wherein said valve body and said casing are made of materials having different hardnesses.

6. The flow control valve of claim 1, wherein said motor is an AC servo motor.

7. The flow control valve of claim 1, wherein said motor is a DC servo motor.

8. The flow control valve of claim 1, wherein said motor is a stepping motor.

9. The flow control valve of claim 1, wherein said motor is a pulse motor.

* * * * *